US008925376B2

(12) United States Patent
Proksch et al.

(10) Patent No.: US 8,925,376 B2
(45) Date of Patent: *Jan. 6, 2015

(54) FULLY DIGITALLY CONTROLLER FOR CANTILEVER-BASED INSTRUMENTS

(75) Inventors: Roger Proksch, Santa Barbara, CA (US); Jason Cleveland, Ventura, CA (US); Dan Bocek, Goleta, CA (US); Todd Day, Santa Barbara, CA (US); Mario B. Viani, Santa Barbara, CA (US); Clint Callahan, Santa Barbara, CA (US)

(73) Assignees: Oxford Instruments PLC, Oxfordshire (GB); Oxford Instruments AFM, Inc, Pleasanton, CA (US)

( * ) Notice: Subject to any disclaimer, the term of this patent is extended or adjusted under 35 U.S.C. 154(b) by 116 days.

This patent is subject to a terminal disclaimer.

(21) Appl. No.: 13/533,078

(22) Filed: Jun. 26, 2012

(65) Prior Publication Data
US 2012/0266336 A1 Oct. 18, 2012

Related U.S. Application Data

(60) Continuation of application No. 12/826,541, filed on Jun. 29, 2010, now Pat. No. 8,205,488, which is a division of application No. 11/768,854, filed on Jun. 26, 2007, now Pat. No. 7,937,991, which is a continuation of application No. 10/740,940, filed on Dec. 18, 2003, now Pat. No. 7,234,342.

(60) Provisional application No. 60/434,572, filed on Dec. 18, 2002.

(51) Int. Cl.
| | |
|---|---|
| G01B 5/28 | (2006.01) |
| G01Q 10/06 | (2010.01) |
| G01Q 60/24 | (2010.01) |
| G01Q 30/04 | (2010.01) |
| B82Y 35/00 | (2011.01) |

(52) U.S. Cl.
CPC ............... *G01Q 10/06* (2013.01); *G01Q 30/04* (2013.01); *B82Y 35/00* (2013.01)
USPC .................................. 73/105; 850/1; 850/33

(58) Field of Classification Search
CPC ......... G01B 5/28; G01Q 10/06; G01Q 30/04; B82Y 35/00
USPC ........................................ 73/105; 850/1, 33
See application file for complete search history.

(56) References Cited

U.S. PATENT DOCUMENTS

| | | |
|---|---|---|
| 5,025,658 A | 6/1991 | Elings et al. |
| RE34,489 E | 12/1993 | Hansma et al. |

(Continued)

FOREIGN PATENT DOCUMENTS

WO 0248644 6/2002

*Primary Examiner* — Daniel S Larkin
(74) *Attorney, Agent, or Firm* — Law Office of Scott C. Harris, Inc.

(57) ABSTRACT

A controller for cantilever-based instruments, including atomic force microscopes, molecular force probe instruments, high-resolution profilometers and chemical or biological sensing probes. The controller samples the output of the photo-detector commonly used to detect cantilever deflection in these instruments with a very fast analog/digital converter (ADC). The resulting digitized representation of the output signal is then processed with field programmable gate arrays and digital signal processors without making use of analog electronics. Analog signal processing is inherently noisy while digital calculations are inherently "perfect" in that they do not add any random noise to the measured signal. Processing by field programmable gate arrays and digital signal processors maximizes the flexibility of the controller because it can be varied through programming means, without modification of the controller hardware.

11 Claims, 9 Drawing Sheets

(56) References Cited

U.S. PATENT DOCUMENTS

| | | |
|---|---|---|
| 6,243,652 B1 | 6/2001 | Fawcett et al. |
| 6,668,666 B1 | 12/2003 | Chen et al. |
| 6,906,532 B2 | 6/2005 | Slates |
| 7,165,445 B2 | 1/2007 | Bocek et al. |
| 8,205,488 B2 * | 6/2012 | Proksch et al. ............ 73/105 |
| 2002/0175677 A1 | 11/2002 | Proksch et al. |
| 2003/0232605 A1 | 12/2003 | Peng |
| 2004/0081256 A1 | 4/2004 | Shi et al. |
| 2004/0084618 A1 | 5/2004 | Spizig et al. |

\* cited by examiner

*Nano* 
Lithography

FULLY DIGITALLY CONTROLLER FOR CANTILEVER-BASED INSTRUMENTS

CROSS-REFERENCE TO RELATED APPLICATIONS

This application is a continuation application of and claims priority to U.S. application Ser. No. 12/826,541 filed Jun. 29, 2010, now U.S. Pat. No. 8,205,488 issued Jun. 26, 2012, which is a divisional application of U.S. Ser. No. 11/768,854 filed Jun. 26, 2007, now U.S. Pat. No. 7,937,911 issued May 10, 2011, which is a continuation application of U.S. application Ser. No. 10/740,940, filed on Dec. 18, 2003, now U.S. Pat. No. 7,234,243 issued Jun. 26, 2007, which claims priority to U.S. Provisional Application 60/434,572, filed Dec. 18, 2002. The disclosure of the prior applications are considered part of (and are incorporated by reference in) the disclosure of this application.

BACKGROUND

The present invention is related to an apparatus for controlling the operation of cantilever-based instruments, and a general method for using the apparatus, using digital electronics except where fundamentally not possible.

Cantilever-based instruments include such instruments as atomic force microscopes, molecular force probe instruments, high-resolution profilometers and chemical or biological sensing probes. An atomic force microscope (AFM) is a device used to produce images of surface topography (and other sample characteristics) based on information obtained from rastering a sharp probe on the end of a cantilever over the surface of the sample. Deflections of the cantilever, or changes in its oscillation, which are detected while mastering correspond to topographical (or other) features of the sample. Deflections or changes in oscillation are typically detected by an optical lever arrangement. A number of other detection means have also been used, including tunneling detection, interferometry, piezo response (strain gauge) and capacitance. In the case of an optical lever arrangement, a light beam is directed onto a cantilever in the same reference frame as the optical lever. The beam reflected from the cantilever is made to illuminate a position sensitive detector (PSD). As the deflection or oscillation of the cantilever changes, the position of the reflected spot on the PSD changes, causing a change in the output from the PSD. Changes in the deflection or oscillation of the cantilever are typically made to trigger a change in the vertical position of the cantilever base relative to the sample, in order to maintain the deflection or oscillation at a constant pre-set value. It is this feedback that generates an AFM image. AFMs can be operated in a number of different imaging modes, including contact mode where the tip of the cantilever is in constant contact with the sample surface, and oscillatory modes where the tip makes no contact or only intermittent contact with the surface. Other information regarding the cantilever can be collected with an optical lever arrangement, including the phase or frequency of oscillation or in-phase and quadrature responses, and this information used to form images of the sample. These images will have a variety of interpretations including sample elasticity, dissipation and adhesive properties. In this manner, it is possible to associate various topographical features with other mechanical, chemical and electrical properties.

A typical prior art optical lever system is illustrated in FIG. 1. In this system a light beam 2, preferably formed by a light source 1 (including a super-luminescent diodes or a laser) with sufficient intensity and lack of pointing or other noise, is directed through a collimation lens or lens assembly 3 and a focusing lens or lens assembly 5 and onto a mirror 6 which directs the focused light beam 7 onto a particular spot on a cantilever 8 in the same reference frame as the optical lever system. The reflected beam 9 is then collected by detection optics, which often include an adjustable mirror 13 and a translation stage for providing an offset to the beam position (not shown), and made to illuminate a position sensitive detector 10 (PSD).

Different AFMs present different schemes for rastering the tip over the sample while detecting cantilever deflection or oscillation and correcting the vertical position of the cantilever base. U.S. Pat. No. Re 34,489, Atomic Force Microscope with Optional Replaceable Fluid Cell, describes an AFM in which the sample is mounted on an arrangement of piezo tube scanners beneath a stationary cantilever. The piezos position the sample in all three dimensions. Another AFM is described in U.S. Pat. No. 5,025,658, Compact Atomic Force Miocroscope. In this AFM, the sample is stationary, lying below an arrangement of piezo tube scanners carrying the cantilever. The piezos position the cantilever in all three dimensions. A third AFM is described in the inventors' co-pending application Ser. No. 10/016,475, Improved Linear Variable Differential Transformers for High Precision Position Measurements. In this AFM, the sample is mounted on a precision stage which employs piezo stacks to position the sample in the x and y dimensions, while the cantilever is mounted on a third piezo stack above the sample which positions it in the z dimension. The x-y position is thus decoupled from the z-position. All three dimensions are sensored with linear variable differential transformers to provide precise positional information. More detailed descriptions of these three AFMs is to be found in the referenced patents and application.

Previously, the electronic circuitry employed to interpret the output from the PSD, calculate the change in the vertical position of the cantilever base relative to the sample required to maintain the deflection or oscillation of the cantilever (the "error signal") at a constant pre-set value and transmit the signals necessary to effectuate this change, as well as those necessary to form images of the sample, has been analog circuitry or, in relatively recent cases, mixed analog and digital circuitry. Analog and mixed analog/digital circuitry has also been used to detect the phase or frequency of oscillation of the cantilever or in-phase and quadrature responses, where those features have been made available. The repository for the devices implementing this circuitry is typically called a controller, although in some instances, some of the devices have been placed in the computer which serves as an interface between the user and the controller.

The inventors here have proceeded from the position that analog electronics in a controller often contribute noise and other problems in the operation of AFMs and other cantilever-based instruments. The invention disclosed herein, therefore, employs digital electronics in key locations in the controller that lead to improved performance and flexibility. We have also included improved signal routing capabilities based on a mixed analog/digital device that greatly improves the flexibility of the instrument. This new architecture allows all of the functionality of past AFM controllers to be duplicated as well as allowing a great deal of new functionality previously impossible to accomplish with analog circuits.

Analog circuits have used single channel lock-in amplifiers to measure a phase shift between the cantilever and drive signal. FIG. 2 shows a typical such amplifier. Here the AFM is being operated in an oscillatory mode, with the oscillation of the cantilever produced by an oscillator 20, the signal from which is also routed through a phase shifter 21. The phase dependent signal results from a simple analog multiplication of the reference signal from the phase shifter 21 and an automatic gain controlled 22 version of the signal 23 from the PSD (not shown), and low pass filtering 25 the output. The multiplication is performed by an analog mixer or multiplier 24. The output of this type of circuit is dependent on the cantilever phase. To the first order, the measurement is proportional to the cosine of the phase angle. This approach is very simple to implement, but, because of its nonlinearity and limitations inherent in automatic gain control circuits, is very inaccurate for large phase angles.

FIG. 3 depicts another prior art analog signal processing circuit, a two phase lock-in amplifier. In this prior art, the signal 26 (not automatic gain controlled) from the PSD (not shown), is analog multiplied against both a 0 degree reference (the "in phase" component or "I"), and a 90 degree reference (the "quadrature" component or "Q") and low pass filtering 25 the respective outputs. Each multiplication is performed by an analog mixer (or multiplier) 24. This circuit relies upon a digital device, a direct digital synthesizer 27, for a signal to control oscillation of the cantilever (the oscillation is physically accomplished by a piezo, which is not shown) and the quadrature version of that signal. However, both signals are routed through digital-to-analog converters 28 before the analog multiplication. Similarly, the output from the analog multipliers 24 is routed through another digital device, a digital signal processor 29 (DSP), where the amplitude and phase are calculated from the in-phase and quadrature signals. This too requires converters, in this case analog-to-digital converters 30. In some cases, this DSP is not physically part of the controller, but is instead located on a plug-in card on the computer motherboard. It produces more satisfactory phase results than the single channel lock-in amplifier because it is not subject to the limitations introduced by automatic gain controlled, and the phase in this case is mathematically correct. Nevertheless, analog electronics continue to exact a high price in terms of noise and nonlinearities. The main shortcoming of this approach is that it still relies on analog multipliers. These devices are inherently noisy, nonlinear, subject to frequency and temperature dependent errors. and bleed-through of the mixer references in the output signal.

In addition to the defects and disadvantages already discussed, prior art controllers also have severe upgrade limitations. Typically, they require the purchase of new hardware boxes, cards, modules or some other add-on to alter their functionality or add new features. Even worse, they may require the whole controller be sent back to the factory to do something as trivial as fix a bug in the hardware.

DETAILED DESCRIPTION

As noted above, the invention disclosed herein is a controller for AFMs and other cantilever-based instruments which uses digital electronics in key locations in the controller that lead to improved performance and flexibility. We have also included improved signal routing capabilities based on a mixed analog/digital device that greatly improves the flexibility of the instrument. This new architecture allows all of the functionality of past AFM controllers to be duplicated as well as allowing a great deal of new functionality previously impossible to accomplish with analog circuits.

Without alteration, the disclosed controller may not be used in connection with AFMs that employ piezo tube scanners for rastering the tip over the sample while detecting cantilever deflection or oscillation and correcting the vertical position of the cantilever base. This includes the AFMs disclosed in U.S. Pat. No. Re 34,489 and U.S. Pat. No. 5,025,658, previously discussed. The disclosed controller may be used in connection with the AFM disclosed in the inventors' co-pending application Ser. No. 10/016,475 and AFMs of similar structure. The disclosed controller also facilitates the use of feedback from LVDTs of the type disclosed in that application to more precisely control the opation of an AFM.

Figure 4A:
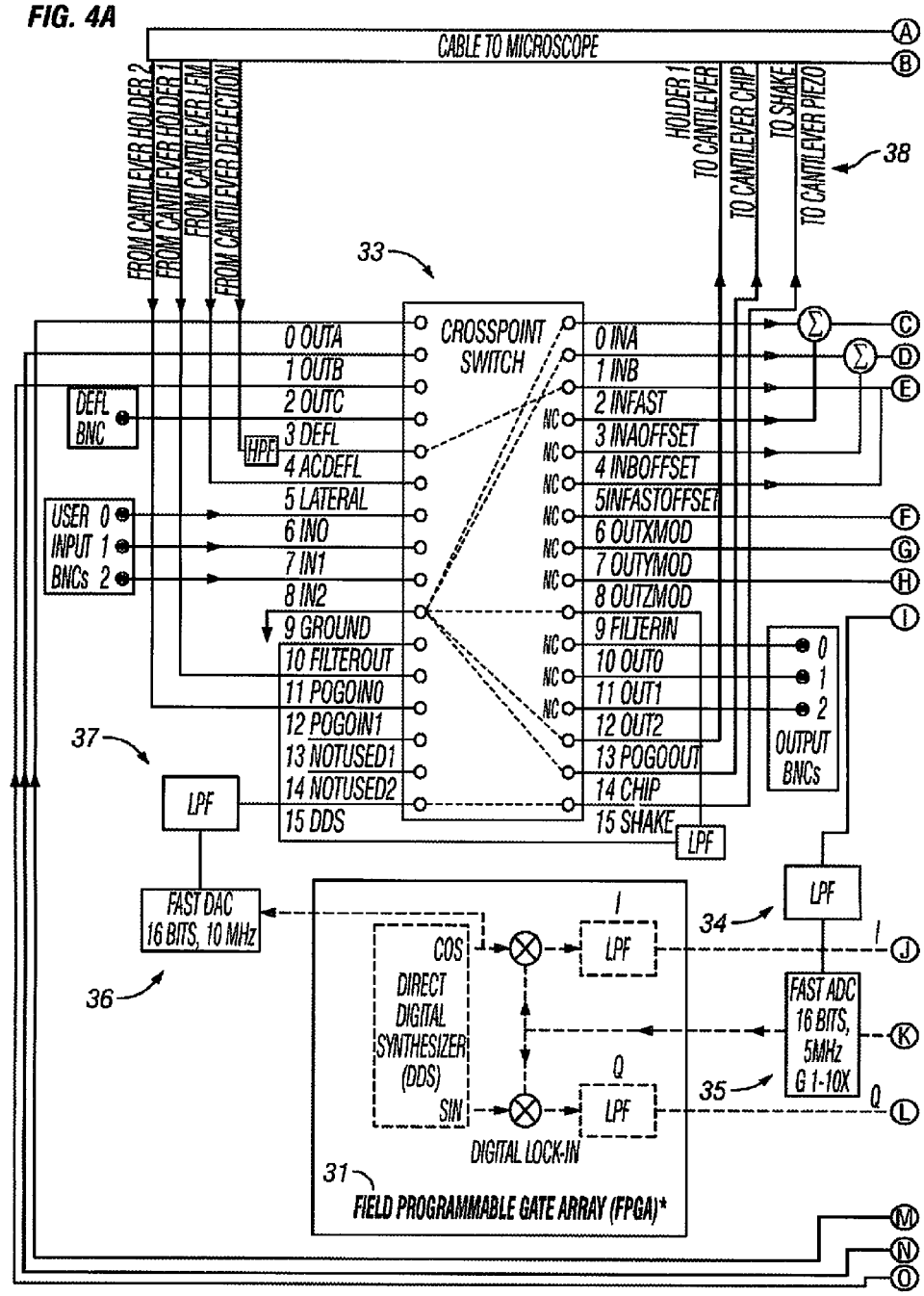
FIGS. 4A-4B: Block diagram for the controller disclosed herein.
Figure 4B:
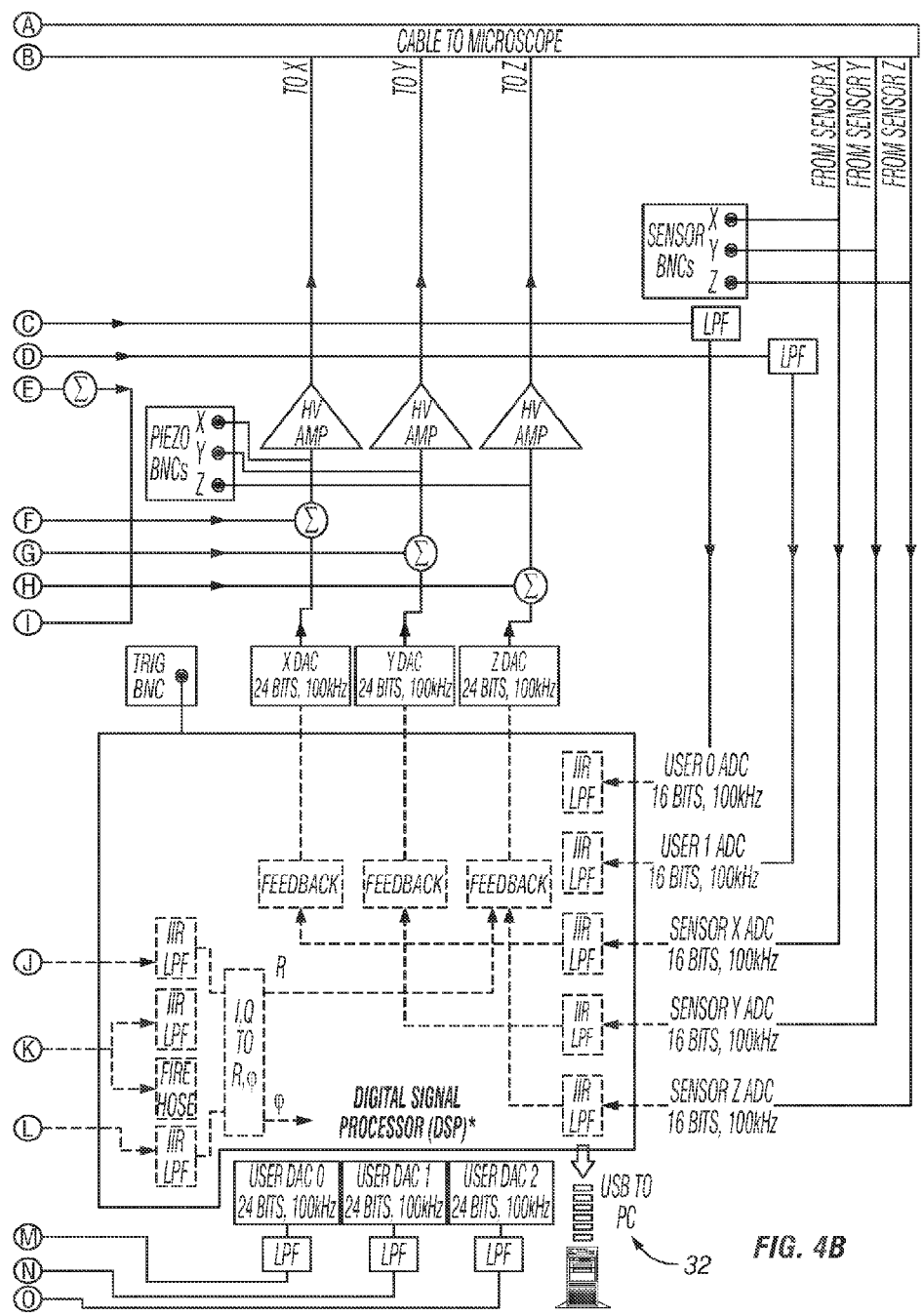

A basic schematic of the new controller is shown in FIGS. 4A-4B. Three major elements of the disclosed controller are of particular significance in providing the digital solution which in turn creates enhanced functionality. These are a field programmable gate array 31 (FPGA), a digital signal processor 32 (DSP) and a crosspoint switch 33. The circuit may also include a Fast DAC 36 and a LPF 37. Each of these elements will be discussed separately below.

Figure 1:
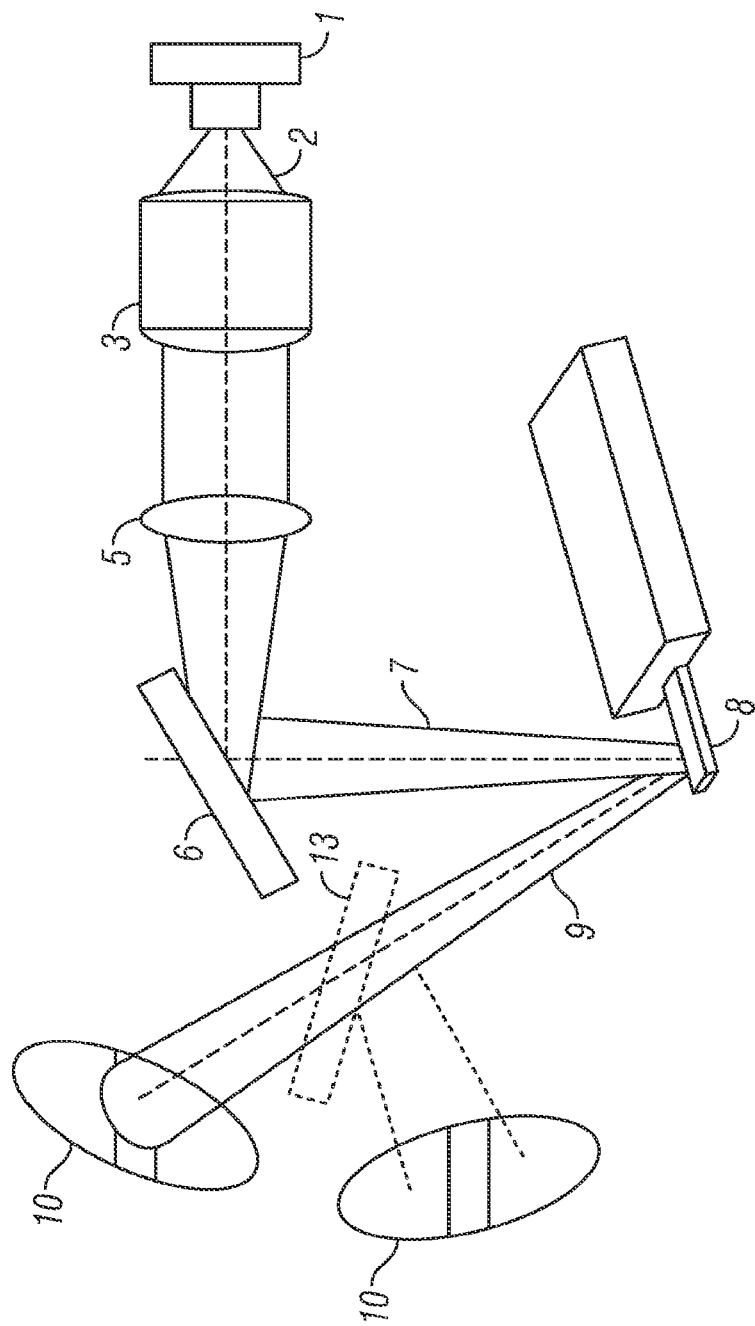
FIG. 1: Prior art showing the optical detector for an atomic force microscope with the cantilever positioned in the reference frame of the detector.
Figure 2:
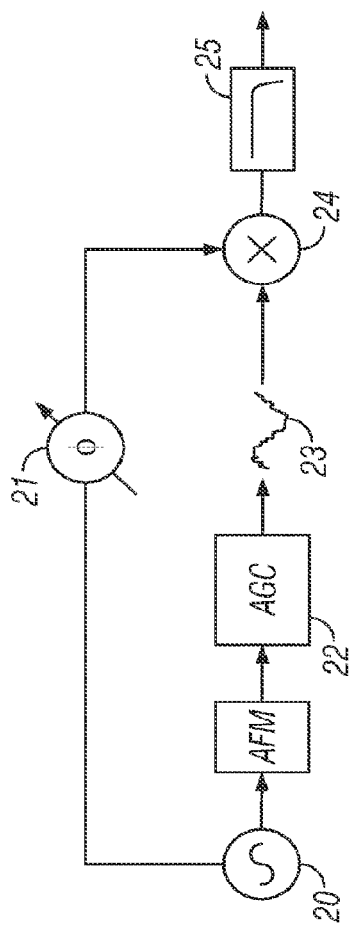
FIG. 2: Block diagram showing a prior art single channel lock-in amplifier for an oscillatory mode in a controller for an atomic force microscope.
Figure 3:
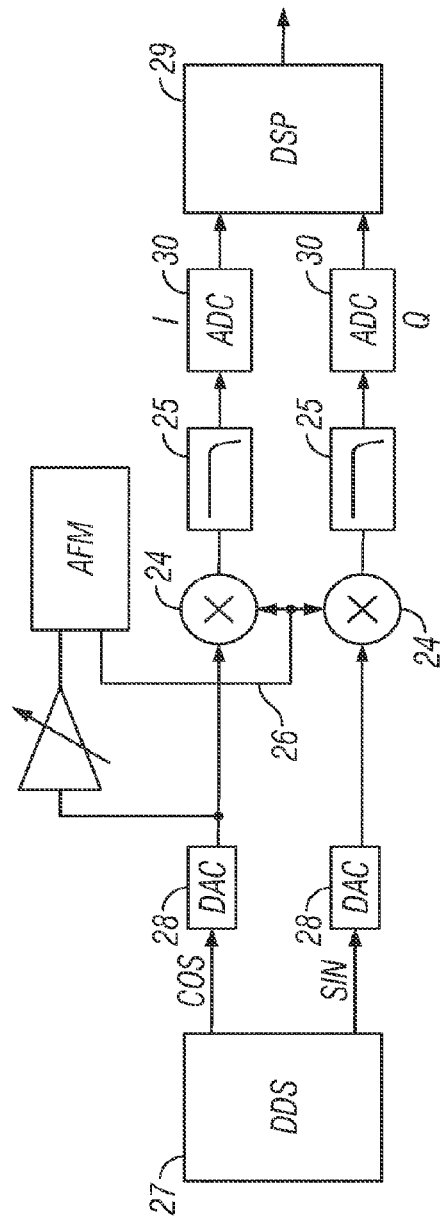
FIG. 3: Block diagram showing a prior art two channel lock-in amplifier for an oscillatory mode in a controller for an atomic force microscope.

The remainder of FIGS. 4A-4B includes the connections to the AFM ("Cable to Microscope"), connections to the computer interface ("USB to PC"), a variety of BNCs allowing user input to different controller functions and three high voltage amplifiers ("HV Amp") that are used to deliver analog drive signals to an x-y scanner and to the piezo controlling the z position of the cantilever. As depicted, the disclosed controller diagram is shown programmed for imaging in an oscillatory mode. This is meant as a pedagogical construction, numerous other configurations are easy to program. In this example, the analog cantilever deflection signal ("From Cantilever Deflection" in the upper left corner of FIGS. 4A-4B) from the PSD (not shown) is high pass filtered to remove any dc signal and fed to input 4 on the left side of the crosspoint switch 33 ("ACDefl") from which it is switched to output 2 on the right side of the switch ("Infast") and from there via an analog anti-aliasing filter 34 to a high speed (16 bit, 5 MHz) analog-to-digital converter 35. After the ADC conversion, everything in the signal chain is computed purely digitally, so the signal magnitude and phase quantities are essentially perfect. Thus, apart from some filtering to remove parts of the signal without value for the digital computation process, the deflection signal is digitized directly after its detection and fed into the FPGA 31 where it is digitally mixed or multiplied, in a manner analogous to the analog two phase lock-in amplifier (FIG. 3). After being mixed the two resulting digital signals are digitally low pass filtered and sent to the DSP where the in-phase and quadrature components are transformed into magnitude and phase. The magnitude is used in a digital feedback computation. The result of that computation is sent to a digital-to-analog converter and, after amplification, the analog signal causes the piezo controlling the z position of the cantilever to move in the appropriate direction. In addition to its function in connection with the mixing of the digitized deflection signal, equivalent to that already described above with the description of the two phase lock-in amplifier, the direct digital synthesizer forming part of the FPGA 31 also is used to generate a signal to control oscillation of the cantilever. The signal is sent to a digital-to-analog converter, low pass filtered and fed to input 15 on the left side of the crosspoint switch 33 ("DDS") from which it is switched to output 15 on the right side of the switch ("Shake"). From there it is sent to a "shake" piezo 38 which physically accomplishes the oscillation.

Although not shown in FIGS. 4A-4B, the disclosed controller implements autoconfiguration using a multidrop bus, using technology which is well known to those skilled in the art. Multidrop buses allows serial numbers, device parameters and features of hardware devices to be permanently recorded. When a device is plugged in or unplugged from the interconnect boards or controller, the bus allows these devices to be auto detected and the appropriate parameters to be updated in the software. The multidrop bus also supports integrated sensors in the devices. This allows temperature derating of device parameters to be performed. The temperature sensors can also be employed for fault detection.

Field Programmable Gate Array. An FPGA is a piece of programmable hardware consisting of an array of logic blocks and interconnections among the blocks. Both the logic blocks and the interconnections can be dynamically configured and reconfigured to perform a very large number of low and high level hardware functions. Moreover, it can be dynamically configured and reconfigured to do many tasks all at once (in parallel). Because of this intrinsic parallelism, a FPGA is capable of doing calculations hundreds or thousands of times faster than a typical microprocessor or DSP.

It is useful to compare a FPGA with a DSP to capture some idea of the speed and capacity of a FPGA. One benchmark for how well a DSP performs is the number of multiplies it can perform in one second. Current DSPs have a clock frequency on the order of 100 MHz. If a single calculation is done in a single clock cycle, it means that at best, such DSPs can perform roughly one hundred million calculations every second. Since a multiplication is an easy task for an FPGA to perform, a typical FPGA could be configured it to do, for example, 100 multiplies during the same clock cycle. The typical FPGA, therefore, is at least a factor of 100 faster than the typical DSP. It can carry out 10,000,000,000 multiplies per second, while the typical DSP is carrying out only 100,000,000. The FPGA's capacity to do many things at once make it a powerful and unique tool to have in an AFM controller's signal processing chain. Implementing a digital dual-phase lock-in, a DDS, several filter chains and everything else needed for an all digital AFM controller using just a DSP (or even numerous DSP's, for that matter) would be extremely difficult whereas the controller including an FPGA described here has demonstrated it.

Figure 5:
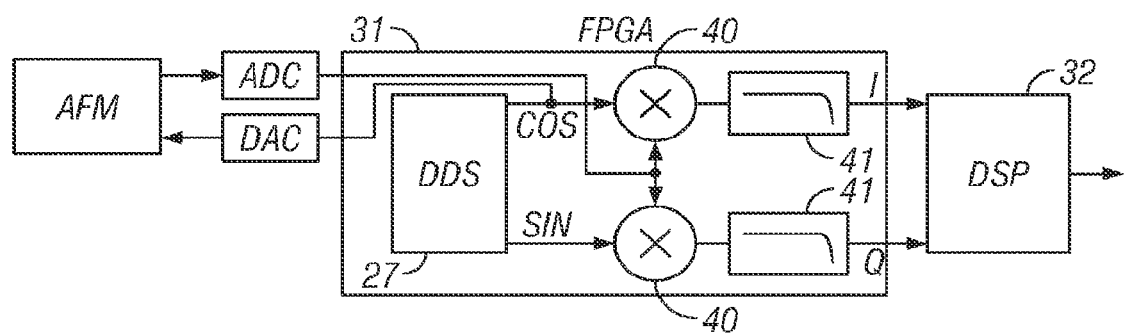
FIG. 5: Detailed block diagram for the field programmable gate array shown in FIGS. 4A-4B.

FIG. 5 depicts the functions implemented in FPGA 31 forming part of the disclosed controller. These include a digital dual-phase lock-in, a direct digital synthesizer 27 (DDS) that generates sine waves of user selectable frequencies and various digital filters 41. Each of these functions may be dynamically reconfigured, when necessary.

As shown in FIG. 5, and as mentioned above, the FPGA implements a fully digital lock-in. This lock-in is analogous to that described above with the description of the analog two phase lock-in amplifier (FIG. 3). Here, however, the unreliable analog multipliers 24 of FIG. 3 are replaced by digital mixers or multipliers 40, which are immune to effects of temperature, frequency and bleed-through present in analog multipliers, eliminating these as error sources and providing a high-fidelity output signal. Also note that, as mentioned above, because the entire lock-in is digital and is described by software, any aspect of it can be upgraded or changed by simply reprogramming the FPGA. This includes changing the detection scheme entirely. For example, experiments which require the amplitude of the cantilever to be calculated on a cycle by cycle basis (such as a fast AC or intermittent contact mode), the lock-in programmed into the FPGA can be replaced instead with a peak detector program, all without the need for modifications or additions to the controller hardware.

All aspects of all of the signal chains in the disclosed controller involve the FPGA. Accordingly, any modifications, bug fixes, new features, etc. that might need to be made to any of the signal processing hardware during the normal course of the controller's life can now be made by a simple program change.

Digital Signal Processor. The DSP 32 forming part of the disclosed controller is located inside the controller itself rather than inside the interface computer, as has been the case with other scanning probe microscopes. This design simplifies the transfer of data between the DSP and auxiliary devices, such as the FPGA, ADCs, DACs and the cross-point switch. Because the DSP is in the controller, it is possible to use a standard interface between the controller and the computer. In the preferred embodiment, a USB interface was employed. This arrangement also makes it convenient to trade off tasks between the FPGA and the DSP. In general, the DSP is easier to program than the FPGA whereas the FPGA is significantly faster.

Figure 6:
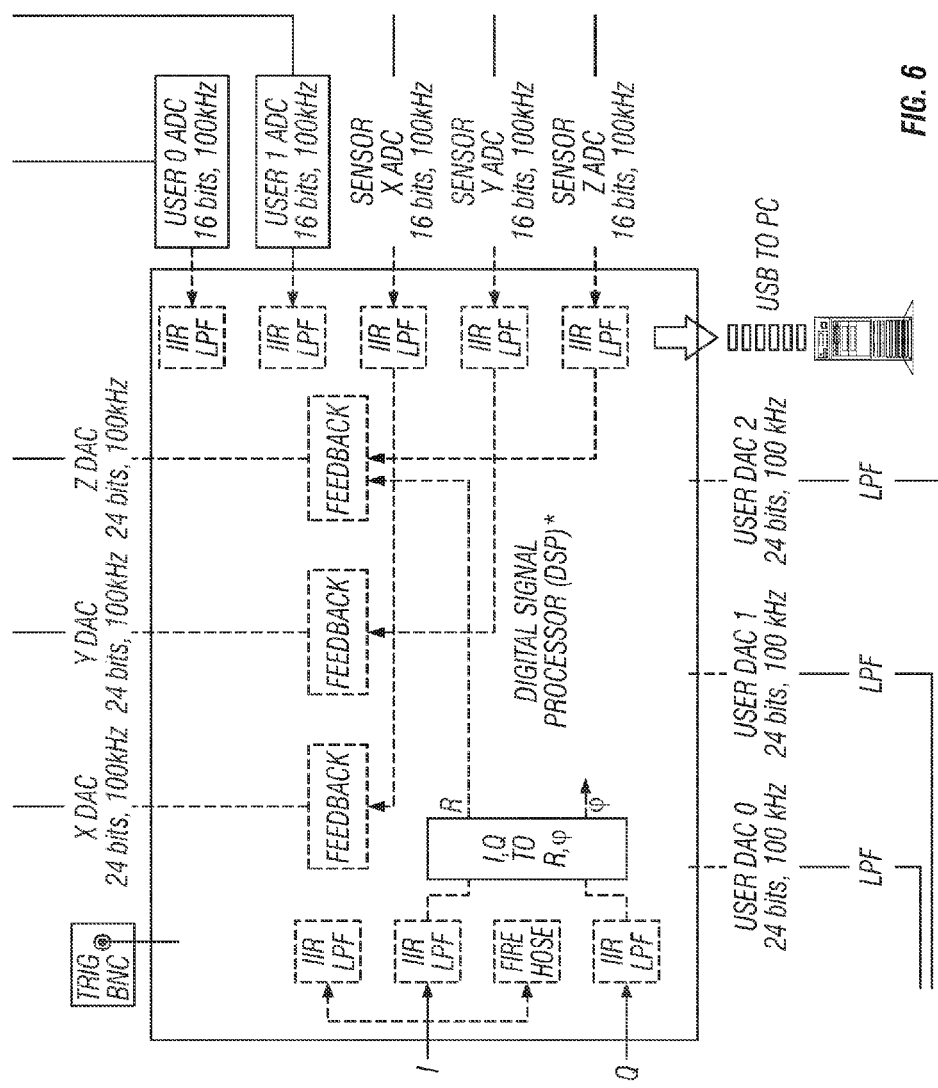
FIG. 6: Detailed block diagram for the digital signal processor shown in FIGS. 4A-4B.

The functions of the DSP 32 are depicted in FIG. 6.

Crosspoint Switch. The crosspoint switch 33 forming part of the disclosed controller, like the DSP, is located inside the controller itself rather than inside the interface computer, or another physically separate receptacle, as has been the case with other scanning probe microscopes. As with the DSP, this design simplifies the transfer of data between the cross-point switch and auxiliary devices, such as the FPGA, ADCs, DACs and the DSP.

Figure 7:
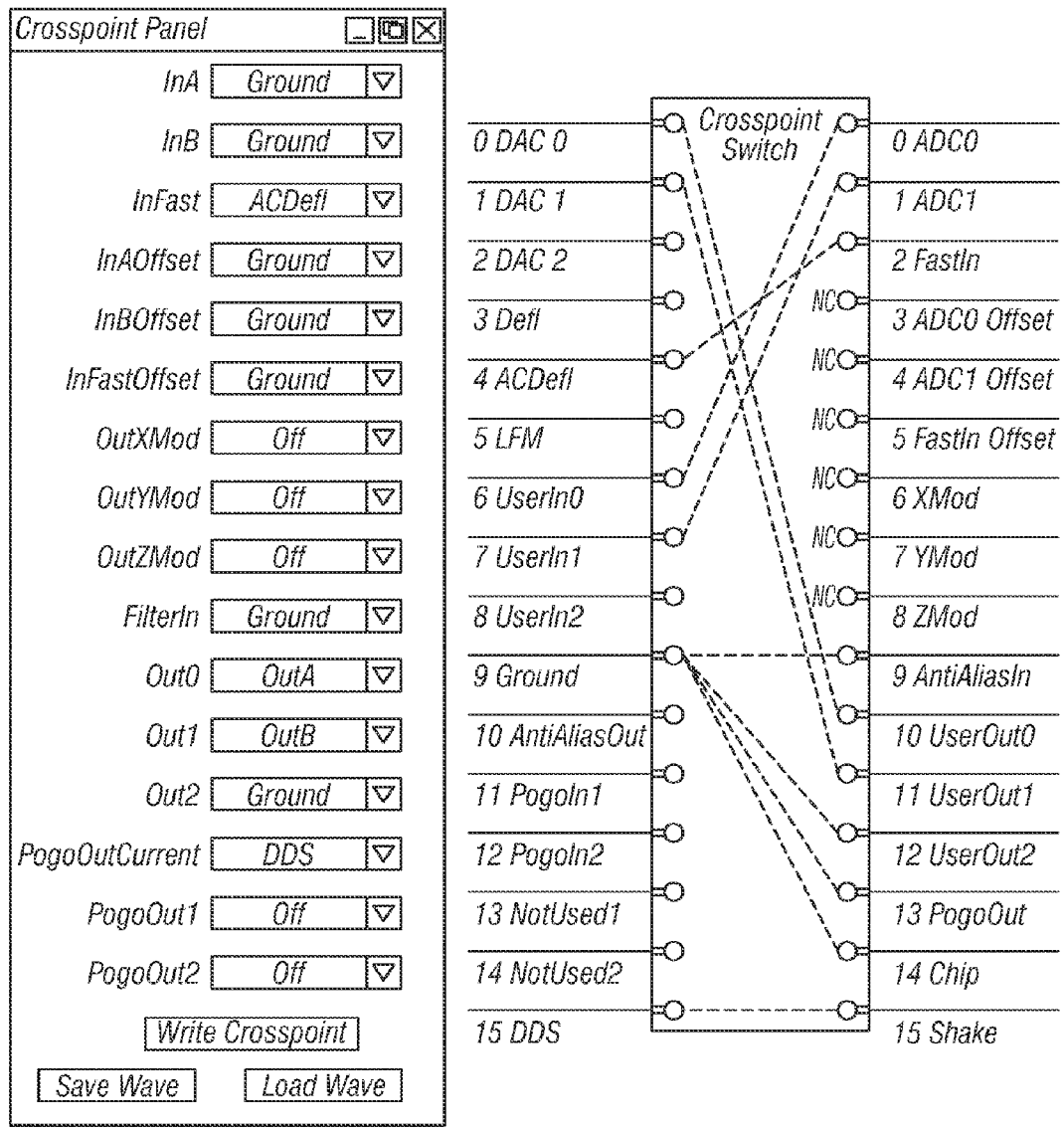
FIG. 7: Detailed block diagram for the crosspoint switch shown in FIGS. 4A-4B.

The functions of the crosspoint switch 33 are depicted in FIG. 7. The crosspoint switch 33 acts as a telephone switchboard for most of the input and output signals within the disclosed controller. Using software commands, the crosspoint switch allows users to route signals to appropriate sections of the hardware. Because of this powerful signal routing flexibility, virtually limitless controller topology configurations can be defined, without the use of additional physical wiring. In addition, as previously discussed, all signals are readily available through the BNCs on the front panel for ease-of-use.

In the preferred embodiment, the crosspoint switch includes sixteen inputs and sixteen outputs. The inputs, on the left side of the crosspoint switch, include several which are dedicated for the purposes of the user (6UserIn0, 7UserIn1 and 8UserIn2) or are not currently used and available for future needs (11PogoIn1, 12PogoIn1, 13NotUsed1 and 14NotUsed2). The same is true of the outputs, on the right side of the crosspoint switch: (10UserOut0, 11UserOut1 and 12UserOut2, 13PogoOut and 14Chip).

The disclosed controller allows an AFM or other cantilever-based instrument to be operated using low-level command developed by the inventors and others linking the controller to a high level software control language, including Igor Pro, MATLAB, LabView and Visual Basic. This allows the instrument to leverage a large number of already existing routines and controls and that in turn allows the rapid development and prototyping of new routines, such as nanolithography and nanomanipulation of the sample, automatic spring calibration and production of images that are limited only by the memory of the computer (4096×4096 pixels for example). Moreover, the high level software control language facilitates user measurements, analysis of data and creation of publication quality figures. This is a significant advantage over proprietary AFM software, where the manufacturer is forced to either duplicate all of these features in the AFM software or the user is forced to run more than one software package to accomplish all of his or her requirements.

Mouse Driven Nanolithography and Manipulation

The following is a small collection of manipulation and lithography experiments made using the MFP-3D. Everything in this collection was done using the MicroAngelo™ interface. Most manipulation sequences begin with an initial reference image. This is followed by the same image with a series of curves drawn onto it. These represent the programmed movement of the cantilever tip during the lithography/manipulation phase. This is followed by a "response" image, showing the effects of the lithography. This process can be repeated, in some cases many times. In addition to simple hand drawn curves and lines, MicroAngelo™ can create mathematically defined curves and arrays. Some examples of this are included at the end. In addition to moving the cantilever tip around, MicroAngelo can also make measurements during the lithography/manipulatio-n process. Examples include monitoring the cantilever height, amplitude, deflection, phase, current or any other data channel including external signals.

Figure 8A:
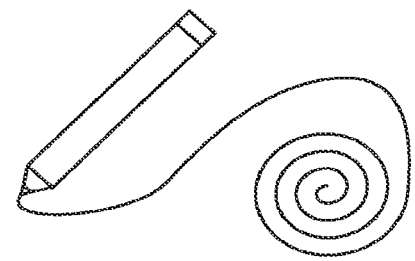
FIGS. 8A-8B: Nanolithography example.
Figure 8B:
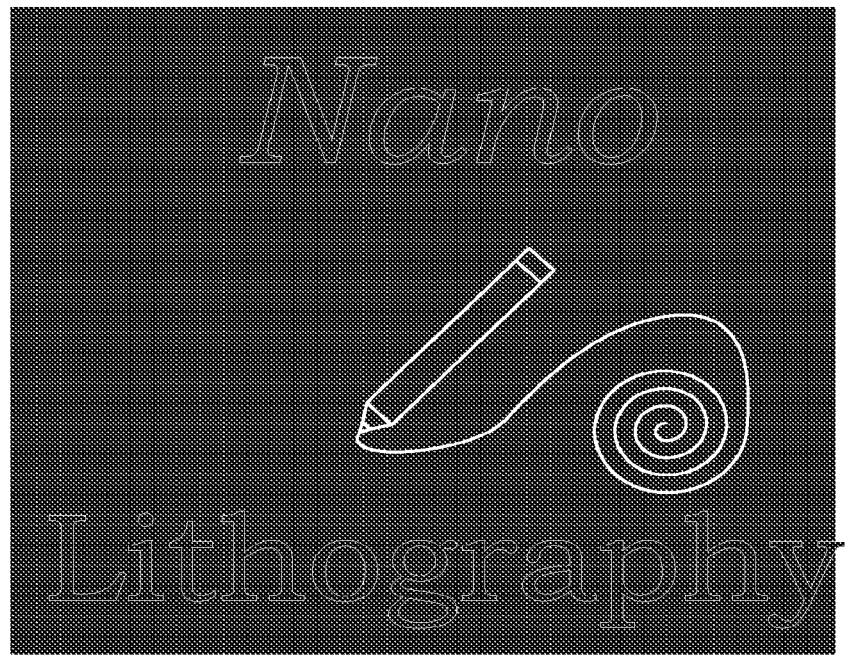

A manipulation demonstration is shown in FIGS. 8A and 8B. Both images of the carbon nanotube was made in AC/repulsive mode with an amplitude of roughly 100 nm. An atomic step is visible in both images. The gray scale was 15 nm and the scan size was 1.45.mu.m. FIG. 8A shows an initial image along with bright line traces sketched using the MicroAngelo™ interface. After the image was completed, the cantilever tip was moved along the bright traces in FIG. 8A. As the cantilever traced the bright paths, the normal loading force was set to 90 nN. The nominal velocity of the cantilever tip was 1 mu.m/second. FIG. 8B shows the resulting motion of the carbon nanotube. The tube section on the lower left side of the image has been separated from the tube section on the upper right portion of the image.

Figure 9A:
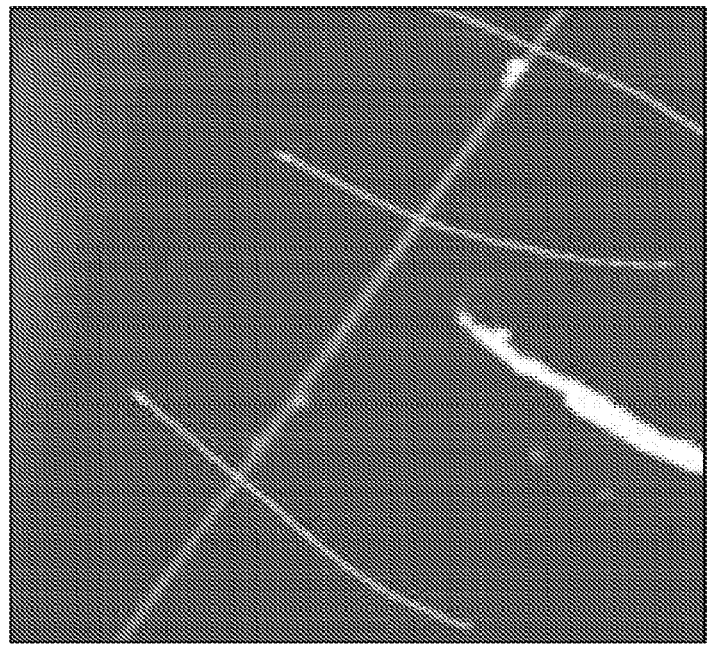
FIGS. 9A-9B: Nanomanipulation example.
Figure 9B:
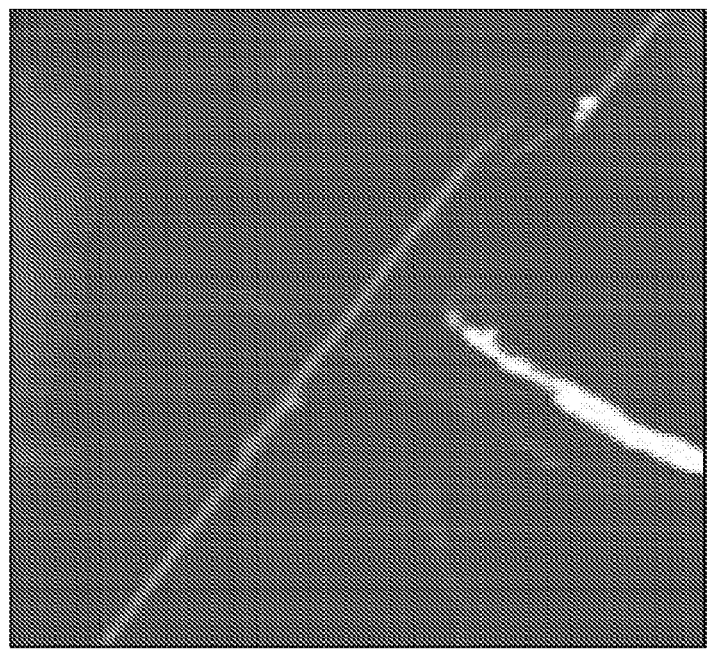

FIG. 9A shows an image generated with external software. The MicroAngelo interface allows the cantilever to trace out the border of this pattern. The border was then in turn traced out onto the surface of Lexan polycarbonate using an Olympus AC240 cantilever and a loading point of approximately 200 nN. After lithography, imaging was performed in AC/repulsive more at an amplitude of 100 nm. The resulting image is shown in FIG. 9B. Obviously, the AFM tip modified the surface, reproducing the border of the original image FIG. 9A.

This controller has a built in rotary encoder and programmable pushbutton switch. This allows control parameters to be manipulated using a "knob" rather than a standard computer keyboard or mouse input.

The described embodiments of the invention are only considered to be preferred and illustrative of the inventive concept. The scope of the invention is not to be restricted to such embodiments. Various and numerous other arrangements may be devised by one skilled in the art without departing from the spirit and scope of the invention.

What is claimed is:

1. An apparatus, comprising:

a connection to receive at least one signal indicative of a movement of a cantilever in an atomic force microscope;

a digital circuit, coupled to receive said at least one signal indicative of movement of said cantilever, and carrying out at least one digital operation in said digital circuit on said signal, where said digital circuit includes both a digital signal processor (DSP), and a field programmable gate array, each of said digital signal processor and said field programmable gate array carrying out digital operations on the signal from the cantilever;

said digital circuit carrying out a first set of digital tasks to process the signal from the cantilever in the digital signal processor DSP, which first set of digital tasks include reprogramming the digital signal processor at specified intervals;

said digital circuit carrying out a second set of digital tasks to process the signal from the cantilever in the field programmable gate array, which second set of digital tasks, which do not require re-programming; and said digital circuit outputting a position correcting signal.

2. The apparatus as in claim 1, wherein said digital circuit operates at a first time, carrying out a first digital operation on the signal from the cantilever in the digital signal processor (DSP), and operates at least a second digital operation on the signal from the cantilever in the field programmable gate array; and at a second time, reprogramming operations carried out by the digital signal processor (DSP), so that at said second time, carrying out said second digital operation on the signal from the cantilever in the digital signal processor (DSP), and carrying out at least said first digital operation on the signal from the cantilever in the field programmable gate array.

3. The apparatus as in claim 1, wherein said digital circuit determines in phase and quadrature components of the signal from the cantilever, and determines magnitude and phase of the in phase and quadrature components, and uses only the magnitude in a digital feedback computation that creates said position correcting signal.

4. The apparatus as in claim 1, further comprising an external controller, sending communication to the digital circuit, said communication including at least a communication which controls said reprogramming.

5. The apparatus as in claim 4, further comprising a USB interface, and wherein said communication is over said USB interface.

6. The apparatus as in claim 1, wherein said first and second digital operations includes a direct digital synthesis.

7. The apparatus as in claim 1, wherein said first and second digital operation includes a digital low pass filter operation.

8. The apparatus as in claim 1, wherein said first and second digital operation includes a digital dual phase lock-in mixer.

9. The apparatus as in claim 1, further comprising a cross point switch, receiving said at least one signal, and enabling said at least one signal to be switched to a plurality of different outputs.

10. The apparatus as in claim 9, wherein said outputs include a first output comprising said field programmable gate array, and a second output comprising said digital signal processor.

11. The apparatus as in claim 1, further comprising at least one analog filter, filtering said at least one signal in a location in a signal path prior to said field programmable gate array and said digital signal processor.

* * * * *